Aug. 9, 1949.  J. J. BRASINGTON ET AL  2,478,178
WARNING LIGHT FOR MOTOR VEHICLES
Filed June 5, 1947  2 Sheets-Sheet 1

Fig. I.

Inventors
John J. Brasington
Bennie T. Brasington

Aug. 9, 1949.   J. J. BRASINGTON ET AL   2,478,178
WARNING LIGHT FOR MOTOR VEHICLES
Filed June 5, 1947   2 Sheets-Sheet 2

Inventors
John J. Brasington
Bennie T. Brasington

By Clarence A. O'Brien
and Harvey B. Jackson
Attorneys

Patented Aug. 9, 1949

2,478,178

UNITED STATES PATENT OFFICE 2,478,178

WARNING LIGHT FOR MOTOR VEHICLES

John J. Brasington and Bennie T. Brasington, Gainesville, Fla., assignors to William E. Bigham, Jr., and Albertus Miller, both of Brooker, Fla.

Application June 5, 1947, Serial No. 752,752

7 Claims. (Cl. 177—327)

The present invention relates to new and useful improvements in warning lights for automobiles or other motor vehicles and more particularly to a revolving light mounted on the top of an automobile whereby the light may be observed from all directions.

An important object of the invention is to provide a lamp housing rotatably mounted on the top of the vehicle and having an electric motor mounted in the housing and arranged to rotate the housing.

A further object of the invention is to provide a novel clutch control means between the housing and the motor to control rotation of the housing.

Another object is to provide a lamp housing rotatably mounted on the top of a vehicle and having a lamp mounted in one end of the housing, together with motor operated means for rotating the housing and swinging the lamp in a horizontal circle together with control means between the motor and the housing and an indicator on the control means to indicate the direction in which the lamp is pointed.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
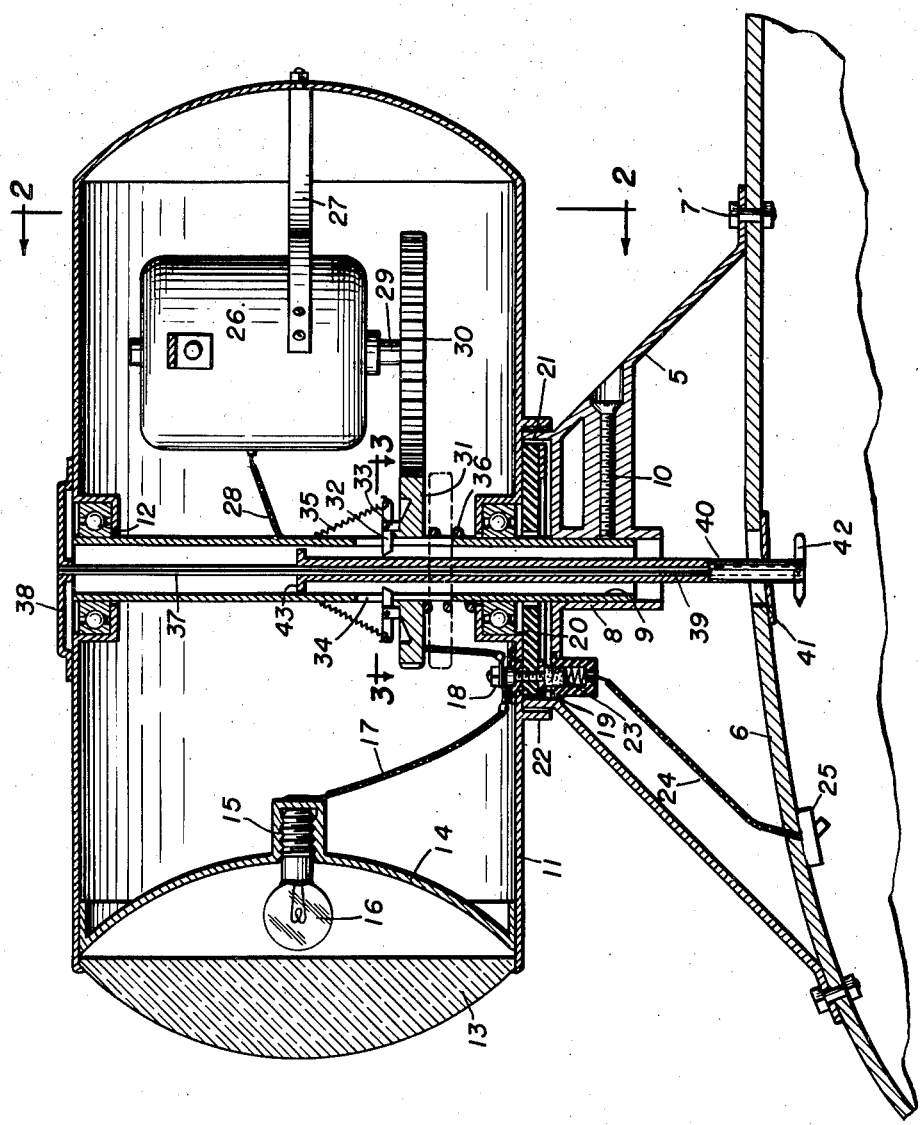
Figure 1 is a vertical sectional view of the lamp housing and mounting therefor.
Figure 2:
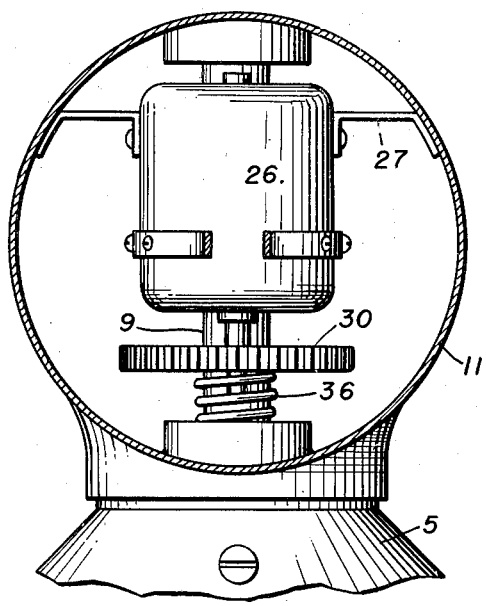
Figure 2 is a transverse sectional view taken on a line 2—2 of Figure 1.
Figure 3:
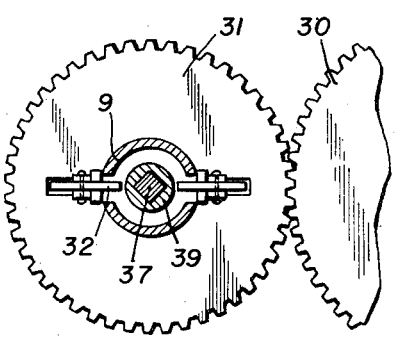
Figure 3 is a fragmentary sectional view of the clutch control means taken on a line 3—3 of Figure 1.
Figure 4:
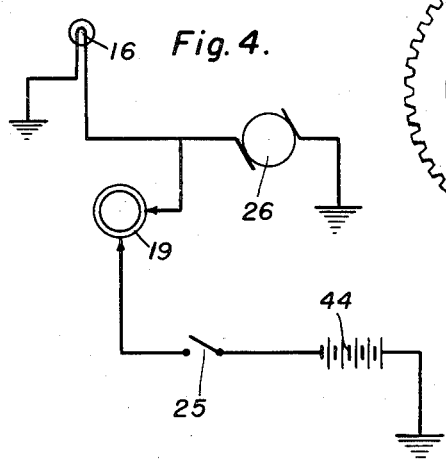
Figure 4 is a diagram of the electric circuit for the lamp and motor operating means for the lamp housing.

Referring now to the drawings in detail, wherein for the purpose of illustration, we have disclosed a preferred embodiment of the invention the numeral 5 designates a hollow base which is secured to the top 6 of an automobile or other motor vehicle by bolts or the like 7.

The base 5 is formed with a tubular socket 8 at its central portion in which the lower end of a stationary hollow shaft 9 is secured by means of a set screw or the like 10, threaded through one side of the base.

The shaft 9 extends upwardly through a horizontally positioned cylindrical lamp housing 11, the housing having bearing assemblies 12 recessed in its upper and lower portions and surrounding the shaft 9 to provide anti-friction rotary means between the housing and the shaft.

One end of the housing 11 is closed by a lens 13 behind which is positioned a reflector 14 having a lamp socket 15 at its central portion and in which a lamp 16 is mounted. A circuit wire 17 extends from the base of the socket 15 to a terminal 18 secured in the housing and having electrical connection with a conductor ring 19 secured on the bottom of the housing by means of an insulation disk 20. The conductor ring 19 and disk 20 are enclosed in an annular flange 21 rising from the base 5, and outwardly of which is a dust ring 22 extending downwardly from the bottom of the housing 11.

A spring projected brush 23 is recessed in the top of the housing with a circuit wire 24 leading therefrom to a switch 25 mounted in the underside of the top 6 of the vehicle.

An electric motor 26 is supported in the rear end of the housing 11 by means of a suitable bracket 27 and is electrically connected to the terminal 18 by a circuit wire 28.

To the motor shaft 29 is attached a gear 30 and with which a gear 31 is movable into and out of engagement. The gear 31 is slidably mounted on the stationary shaft 9, and the gear 31 is held against rotation by a plurality of arms 32 pivoted to one side of the gear 31 by brackets 33 and projecting radially through longitudinally extending slots 34 in the shaft 9. The arms 32 are normally held in a horizontal position by coil springs 35 connecting the outer ends of the arms to the shaft 9.

A coil spring 36 surrounds the shaft 9 under the gear 31 and holds the gear in a raised position in engagement with the gear 30.

A guide rod 37 of polygonal shape in cross-section is supported in a vertical position in the shaft 9 from a cover plate 38 closing the upper end of the shaft 9 and welded or otherwise suitably secured to the top of the housing 11. A control rod 39 having a polygonal bore 40 extending therethrough conforming to the rod 37 is slidably mounted on the rod 37 and extends downwardly through an opening 41 in the top 6 of the vehicle. To the lower end of the rod 39 is secured a pointer 42 and the upper end of the control rod 39 is provided with an outwardly extending flange 43.

The switch 25 is connected in a circuit with the battery 44 of the motor vehicle and upon closing the switch 25, the motor 26 will be energized through the brush 23 and conductor ring 19 and at the same time, the lamp 16 will likewise be energized. The coil spring 36 normally holds the gear 31 in engagement with the gear 30 whereupon the rotation of the gear 30 by the motor will cause the housing 11 to rotate on the stationary shaft 9 since the gear 31 is held stationary to said shaft.

When it is desired to hold the housing 11 stationary while the lamp 16 is energized the pointer 42 is used as a handle whereby to pull the rod 39 downwardly causing the flange 43 to engage the inner ends of the arms 32 to thus lower the gear 31 out of engagement with the gear 30 and the switch 25 may then be closed to energize the lamp 16 while the housing 11 remains stationary.

The housing 11 may also be manually rotated by turning the pointer 42 which in turn will rotate the housing through the rod 39 and guide rod 37.

The pivoted arms 32 and springs 35 enable removal and replacement of rod 39 by sliding a semi-cylindrical sleeve (not shown) upwardly in tube 9 to engage and swing the arms 32 upwardly into the slots 34, whereupon the flange 43 at the upper end of rod 39 may be pulled downwardly out of the tube 9. The springs 35 normally hold the arms 32 horizontally and the inner ends of the arms are limited in their downward swinging movement when the flange 43 is moved downwardly by rod 39 to release the gear 31.

Having described the invention what is claimed as new is:

1. A warning lamp for motor vehicles comprising a lamp housing provided with a lamp opening, means rotatably supporting the housing on a vehicle for horizontal rotation, an electric circuit extending into the housing and having a lamp and a motor connected thereto, a drive connection between the motor and the housing, and clutch means for said drive connection, said motor and clutch means being enclosed in the housing, and manually operated control means for said clutch means positioned outwardly of the housing.

2. A warning lamp for motor vehicles comprising a lamp housing having an opening, means rotatably supporting the housing on a vehicle for horizontal rotation, an electric circuit extending into the housing and having a lamp and a motor connected thereto, a drive connection between the motor and the housing and clutch means for said drive connection, said first named means including a stationary shaft and a stationary gear slidably carried thereby, and said drive connection including a gear driven by the motor and engaging said stationary gear.

3. A warning lamp for motor vehicles comprising a lamp housing having an opening, means rotatably supporting the housing on a vehicle for horizontal rotation, an electric circuit extending into the housing and having a lamp and a motor connected thereto, a drive connection between the motor and the housing and clutch means for said drive connection, said first named means including a stationary shaft and a stationary gear slidably carried thereby, and said drive connection including a gear driven by the motor and engaging said stationary gear, and said last named means operating to engage and disengage said gears.

4. A warning lamp for motor vehicles comprising a lamp housing having an opening, a base mounted on a vehicle and including an upstanding hollow stationary shaft rotatably supporting the housing for horizontal rotation, a stationary gear slidably mounted on said shaft, a motor in the housing having a drive pinion engaging the stationary gear, and means operable outwardly of the housing for sliding said stationary gear into and out of engagement with the pinion.

5. A warning lamp for motor vehicles comprising a lamp housing having an opening, a base mounted on a vehicle and including an upstanding hollow stationary shaft rotatably supporting the housing for horizontal rotation, a stationary gear slidably mounted on said shaft, a motor in the housing having a drive pinion engaging the stationary gear and means operable outwardly of the housing for sliding said stationary gear into and out of engagement with the pinion, said means including a control rod projecting through the base into a vehicle.

6. A warning lamp for motor vehicles comprising a lamp housing having an opening, a base mounted on a vehicle and including an upstanding hollow stationary shaft rotatably supporting the housing for horizontal rotation, a stationary gear slidably mounted on said shaft, a motor in the housing having a drive pinion engaging the stationary gear, and means operable outwardly of the housing for sliding said stationary gear into and out of engagement with the pinion, said means including a control rod projecting through the base into a vehicle, and having a pointer to indicate the position of the housing.

7. A warning lamp for motor vehicles comprising a lamp housing having an opening, a base mounted on a vehicle and including an upstanding hollow stationary shaft rotatably supporting the housing for horizontal rotation, a stationary gear slidably mounted on said shaft, a motor in the housing having a drive pinion engaging the stationary gear, and means operable outwardly of the housing for sliding said stationary gear into and out of engagement with the pinion, said means including a slidable control rod rotatable with the housing, and a pointer carried by the rod to indicate the position of the housing.

JOHN J. BRASINGTON.
BENNIE T. BRASINGTON.

REFERENCES CITED

The following references are of record in the file of this patent:

UNITED STATES PATENTS

| Number | Name | Date |
|---|---|---|
| 1,665,584 | Eddy | April 10, 1928 |
| 1,691,011 | Jackson | Nov. 6, 1928 |
| 1,781,888 | Weidlinger | Nov. 18, 1930 |
| 2,039,647 | House | May 5, 1936 |
| 2,289,482 | Carlson | July 14, 1942 |